United States Patent [19]
Hashimoto et al.

[11] Patent Number: 5,690,730
[45] Date of Patent: Nov. 25, 1997

[54] SINTERING METHOD OF CEMENT CLINKERS AND SINTERING APPARATUS OF THE SAME

[75] Inventors: Isao Hashimoto, Akashi; Shozo Kanamori, Miki; Mikio Murao, Kobe; Norio Yokota, Tokyo; Nichitaka Sato, Tokyo; Katsuji Mukai, Tokyo, all of Japan

[73] Assignees: Kawasaki Jukogyo Kabushiki Kaisha, Kobe; Sumitomo Osaka Cement Co., Ltd., Tokyo, both of Japan

[21] Appl. No.: 637,765

[22] PCT Filed: Sep. 1, 1995

[86] PCT No.: PCT/JP95/01748

§ 371 Date: Apr. 23, 1996

§ 102(e) Date: Apr. 23, 1996

[87] PCT Pub. No.: WO96/07622

PCT Pub. Date: Mar. 14, 1996

[30] Foreign Application Priority Data

Sep. 8, 1994 [JP] Japan .................. 6-240686

[51] Int. Cl.$^6$ ............ C04B 7/45; C04B 7/47; F27B 7/02; F27B 15/00
[52] U.S. Cl. .......... 106/744; 106/743; 106/750; 106/756; 432/14; 432/58; 432/106
[58] Field of Search ............... 106/743, 744, 106/756, 757, 750; 432/14, 15, 58, 106, 51

[56] References Cited

U.S. PATENT DOCUMENTS

| | | | |
|---|---|---|---|
| 5,478,234 | 12/1995 | Yokota et al. | 432/106 |
| 5,536,167 | 7/1996 | Yokota et al. | 432/106 |

FOREIGN PATENT DOCUMENTS

| | | |
|---|---|---|
| 58115047 | 7/1983 | Japan . |
| 61270243 | 11/1986 | Japan . |
| 2229745 | 9/1990 | Japan . |

*Primary Examiner*—Michael Marcheschi
*Attorney, Agent, or Firm*—Leydig, Voit & Mayer, Ltd.

[57] ABSTRACT

A sintering method of cement clinkers in which preheated cement raw material powder is granulated and sintered in a fluidized bed granulating and sintering furnace, and granulated and sintered clinkers are introduced into a cooling device, for manufacturing high-quality cement clinkers by use of a single fluidized bed-granulating and sintering furnace efficiently with a small heat loss, wherein clinkers are discharged from the fluidized bed granulating and sintering furnace through a clinker dropping hole which is provided in a fluidizing gas distributor of the furnace or in a radial direction extending from the gas distributor, an opening area of the clinker dropping hole is regulated by a gate portion to maintain the differential pressure in a fluidized bed within a predetermined range, air for classifying and cooling the clinkers is blown into a discharge chute connected to the clinker dropping hole, the amount of the blown air is regulated to make the flow velocity of the air blowing from the clinker dropping hole different from the flow velocity of air flowing through nozzles of the gas distributor, and the clinkers are introduced into a cooling device through a hermetic discharge device provided below the classifying and cooling air intake position,

16 Claims, 7 Drawing Sheets

SINTERING METHOD OF CEMENT CLINKERS AND SINTERING APPARATUS OF THE SAME

CROSS REFERENCE TO RELATED APPLICATION

This application is national stage application under 35 U.S.C. §371 of International Application No. PCT/JP95/01748, filed Sep. 1, 1995.

TECHNICAL FIELD

The present invention relates to a method of sintering cement clinkers by a single fluidized bed granulating and sintering furnace, and to a sintering apparatus for effecting this method.

BACKGROUND ART

Cement clinkers are manufactured by blending and crushing limestone, silica sand and so forth, preheating this raw material powder, granulating the preheated and partially calcined material powder, sintering the granules, and thereafter cooling them. Recently, cement clinkers are often manufactured by a sintering apparatus comprising two furnaces, i.e., a spouted bed granulating furnace or a fluidized bed granulating furnace and a fluidized bed sintering furnace (see, for example, JP-A-2-229745). This manufacturing apparatus of cement clinkers disclosed in JP-A-2-229745 further includes a primary cooling device and a secondary cooling device.

Also, there has been recently known a sintering apparatus of cement clinkers in which granulation and sintering are conducted by a single fluidized bed furnace (see, for example, JP-A-58-115047).

In the sintering apparatus of cement clinkers disclosed in JP-A-2-229745, raw material is granulated in a spouted bed granulating furnace, sintered in a fluidized bed sintering furnace, quenched in a primary fluidized bed cooling device, and cooled in a secondary fluidized bed cooling device while heat is recovered. This sintering apparatus comprises two furnaces, i.e., the spouted bed granulating furnace and the fluidized bed sintering furnace, so that sintering can be effected at high temperatures, thereby the manufacturing of cement clinkers of a high quality can be achieved. However, the apparatus involves a problem that the number of component devices is large, and that the operating cost of the apparatus is high. Consequently, there has been an increasing demand for the development of a sintering apparatus having a compact structure which can reduce the heat consumption and power consumption by a large degree.

In the sintering apparatus of cement clinkers disclosed in JP-A-58-115047, discharged air from a cooling device is introduced into a discharge chute in such a manner that a plurality of classifying zones of different flow velocities are formed in the discharge chute extending from the sintering furnace. However, since the air flow rate in each duct is determined by a differential pressure, it varies in accordance with the condition of granulated material dropping into the discharge chute, and therefore, it is difficult to regulate the flow velocity of the air at a predetermined level. Furthermore, once the granulated material drops into the chute, it does not disperse well in the chute, therefore the classifying effect in returning fine granules back to the fluidized bed is small.

Consequently, the particle size distribution of clinkers is broad, thereby causing the reduction of quality (sufficient sintering of fine granules cannot be expected). Also, the particle size distribution in the bed becomes broad, and accordingly, an unfavorable phenomenon called agglomeration tends to occur wherein granules stick to one another excessively. As a result, the sintering temperature can not be sufficiently raised, thus making it impossible to obtain cement clinkers of a high quality.

DISCLOSURE OF THE INVENTION

The present invention has been achieved in consideration of the above-described problems. The object of the invention is to provide a method and an apparatus for manufacturing cement clinkers with equipment of an extremely simple single-furnace structure which enables the sintering of cement clinkers of a high quality at low running costs.

In order to achieve the above object, according to the invention, a sintering method of cement clinkers, in which preheated cement raw material powder is granulated and sintered in a fluidized bed granulating and sintering furnace, and granulated and sintered clinkers are introduced into a cooling device, is designed that the clinkers are discharged from the fluidized bed granulating and sintering furnace through a clinker dropping hole provided in the upper surface of a fluidizing gas distributor (perforated plate) of the fluidized bed granulating and sintering furnace or in a radial direction extending from the upper surface of the gas distributor, air for classifying and cooling the clinkers is blown into a discharge chute connected to the clinker dropping hole, while an amount of the air blown, particularly for classifying and cooling, is regulated in such a manner that the flow velocity of the air blowing from the clinker dropping hole is different from the flow velocity of air flowing through nozzles (openings) of the gas distributor, and the clinkers are introduced into the cooling device via hermetic discharge means located below the classifying and cooling air intake position. Normally, the flow velocity of the air blowing from the clinker dropping hole is controlled to be lower than the flow velocity of air flowing into a fluidized bed of the furnace through the openings of the gas distributor.

In this method, the fluidized bed granulating and sintering furnace may comprise a conical member whose upper portion is angularly projected above the gas distributor of the furnace, which conical member is coaxially provided on the gas distributor, so as to form an annular fluidized bed. Preferably, an opening area of the clinker dropping hole is regulated to maintain a differential pressure of the fluidized bed substantially within a predetermined range.

Instead of the classifying and cooling air, classifying air and cooling air may be separately blown into the discharge chute.

Preferably, the temperature of the clinkers in the discharge chute is detected, and the amount of cooling air is regulated in accordance with the detected temperature, thereby controlling the cooling temperature of the clinkers.

According to the invention, a sintering apparatus of cement clinkers, in which preheated cement raw material powder is granulated and sintered in a fluidized bed granulating and sintering furnace, and granulated and sintered clinkers are cooled in a cooling device, is characterised in that a clinker dropping hole is provided in the upper surface of a fluidizing gas distributor (perforated plate) of the fluidized bed granulating and sintering furnace or in a radial direction extending from the upper surface of the gas distributor, the clinker dropping hole is connected to the cooling device via a discharge chute and hermetic discharge means, and a classifying and cooling air intake pipe for classifying and cooling the clinkers is connected to the discharge chute.

In this apparatus, the fluidized bed granulating and sintering furnace may further comprise a conical member whose upper portion is angularly projected above the gas distributor of the furnace, which conical member is coaxially provided on the gas distributor, so as to form an annular fluidized bed. Preferably, a controllable gate is provided in the vicinity of the clinker dropping hole to control an opening area of the clinker dropping hole.

In place of the classifying and cooling air intake pipe, a classifying air intake pipe and a cooling air intake pipe may be separately provided.

It is preferably designed that the gas distributor is inclined, and a clinker dropping hole is provided in a radial direction extending from the lower end of the inclined surface of the gas distributor, through a discharging grooved portion having a plurality of nozzles (openings) and formed between the gas distributor and the clinker dropping hole, while the clinkers are classified right above the clinker dropping hole and on the discharging grooved portion.

In this case, a diameter of the nozzles (openings) of the discharging grooved portion is preferably different from the diameter of nozzles (openings) of the gas distributor. Moreover, a throttle portion for secondary classification of the clinkers may be provided in the discharge chute between the clinker dropping hole and the air intake pipe, and a discharge port for large lumps may be provided in the vicinity of the clinker dropping hole.

Preferably, the cooling device has a structure that a moving bed formed in a main body of the cooling device is moved by the cooling air blown into the main body of the cooling device, and the cross-sectional area of the upper portion of the main body of the cooling device is selected in order to form a partial fluidized bed on the moving bed. For instance, a smaller-diameter portion is provided in the upper portion of the main body of the cooling device, in which the flow velocity of air is increased for forming a partial fluidized bed, thus preventing segregation of the granules.

Preheated cement raw material powder is fed into the fluidized bed of the fluidized bed granulating and sintering furnace, in which the powder is granulated and sintered. Granulated and sintered clinkers are classified on the discharging grooved portion and right above the clinker dropping hole on a side of the upper surface of the gas distributor, by the air blown into the discharge chute, so that fine granules rarely drop into the discharge chute. That is to say, mixing of granules in the discharge chute with granules in the fluidized bed does not occur. Also, granules which have dropped into the discharge chute are effectively cooled by the cooling air. Further, a temperature of the throat portion is lowered, and coating on the lower surface of the gas distributor can be eliminated.

Moreover, since the particle size distribution in the fluidized bed granulating and sintering furnace becomes sharp, agglomeration can be prevented enabling the sintering temperature to be raised.

BEST MODE FOR CARRYING OUT THE INVENTION

The present invention will be hereinafter described more specifically on the basis of the preferred embodiments. The invention will not be restricted to the following embodiments and can be modified in appropriate manners.

Embodiment 1

Figure 1:
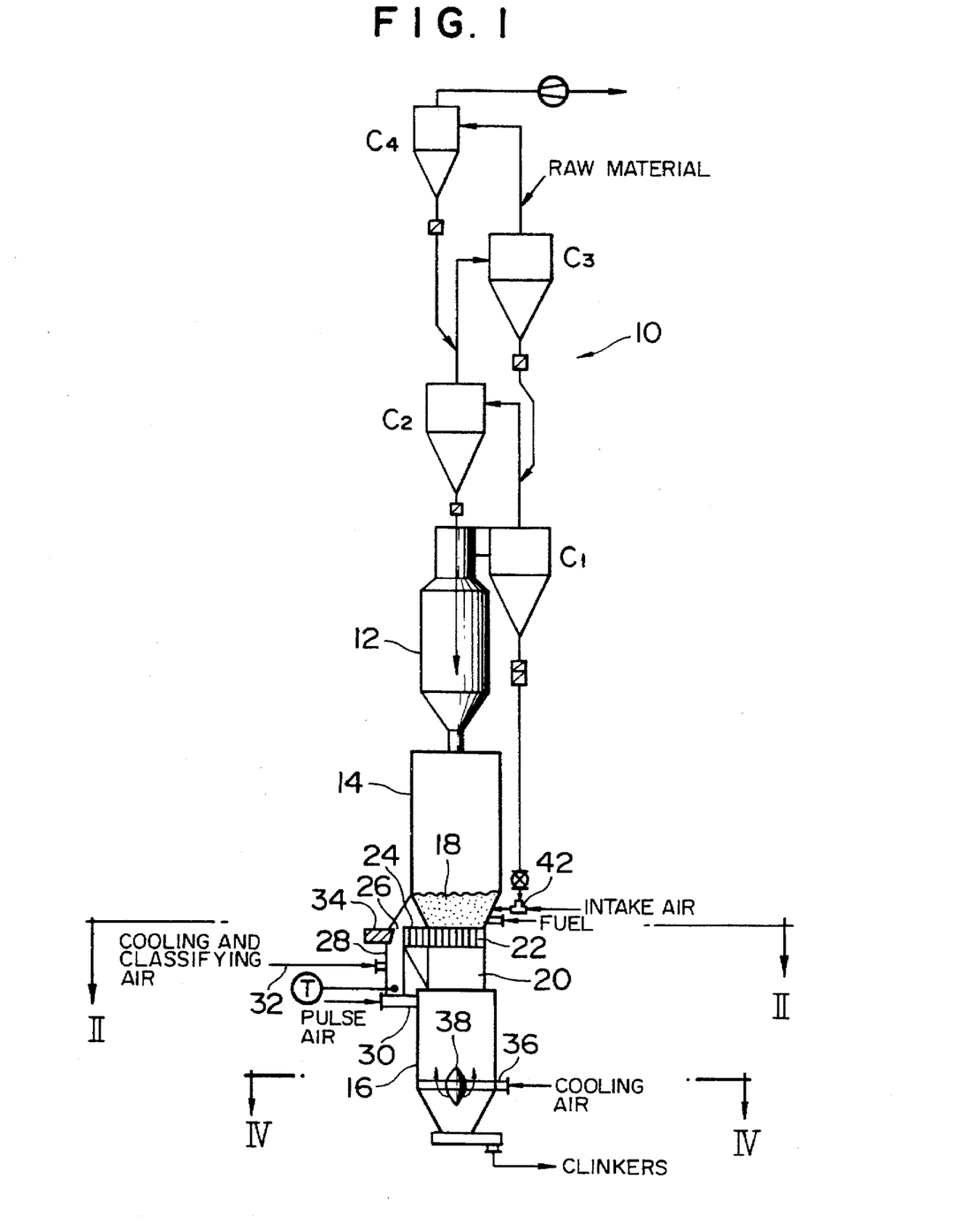
FIG. 1 is an entire system diagram showing one embodiment of a sintering apparatus of cement clinkers according to the present invention, a suspension preheater and so forth.
Figure 2:
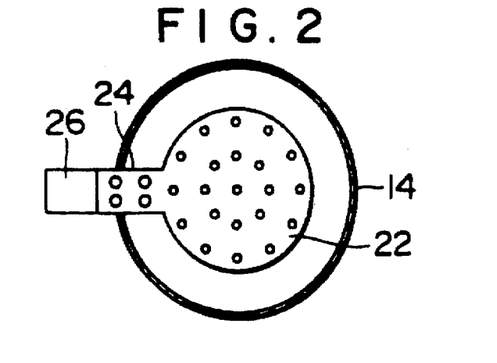
FIG. 2 is an enlarged cross-sectional view taken along the line II—II of FIG. 1, from which a fluidized bed is omitted.
Figure 4:
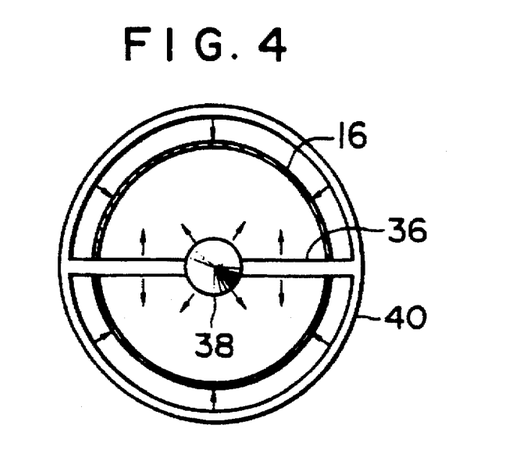
FIG. 4 is an enlarged cross-sectional view taken along the line IV—IV of FIG. 1, from which a moving bed is omitted.

FIG. 1 shows a sintering apparatus of cement clinkers according to the first embodiment of the invention; FIG. 2 is an enlarged cross-sectional view taken along the line II—II in FIG. 1; and FIG. 4 is an enlarged cross-sectional view taken along the line IV—IV in FIG. 1.

In FIG. 1, reference numeral 10 denotes a suspension preheater including cyclones $C_1$ to $C_4$, 12 denotes a calciner, 14 denotes a fluidized bed granulating and sintering furnace, and 16 denotes a cooling device. The calciner 12 is not necessarily required, and so such calciner is not provided in some cases.

Cement raw material powder is preheated and partially calcined by the suspension preheater 10 and the calciner 12. Then, the raw material powder is introduced into a fluidized bed 18 of the fluidized bed granulating and sintering furnace 14, in which the raw material powder is granulated and sintered while being fluidized by the air supplied through the cooling device 16 located below, coming through the throat portion 20 and the fluidizing gas distributor 22. Reference numeral 42 denotes an ejector.

Figure 3:
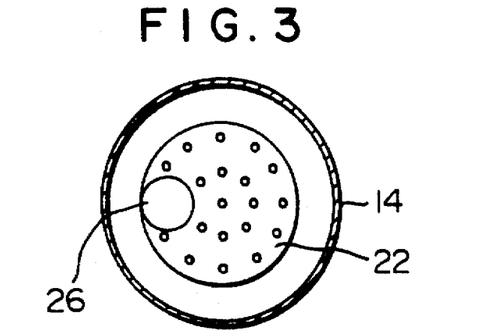
FIG. 3 is an enlarged cross-sectional view shown a modification of the embodiment in FIG. 2.

As shown in FIG. 2, a clinker dropping hole 26 is provided in a radial direction extending from the gas distributor 22, through a discharging grooved portion 24 including a plurality of openings and provided between the fluidizing gas distributor 22 and the clinker dropping hole 26. The clinker dropping hole 26 is connected to the cooling device 16 through a discharge chute 28 and hermetic discharge means 30. A classifying and cooling air intake pipe 32 is connected to the discharge chute 28. As shown in FIG. 3, the clinker dropping hole may be provided in the gas distributor 22.

A gate portion 34 which can control the opening area of the clinker dropping hole 26 is provided in the vicinity of the clinker dropping hole 26. The gate portion 34 is designed to be moved horizontally by drive means (not shown) such as a hydraulic cylinder, a pneumatic cylinder, a motor cylinder and so forth.

Preferably, the diameter of nozzles (openings) of the discharging grooved portion 24 is different from the diameter of nozzler (openings) of the gas distributor 22. In such a structure, clinkers on the gas distributor 22 can drop into the clinker dropping hole 26 while being classified.

As the cooling device 16, a fluidized bed type cooling device or a cooling device wherein a partial fluidized bed is formed on a moving bed is employed. FIGS. 1 and 4 show the latter as one embodiment. Reference numeral 36 denotes a cooling air conduit, 38 denotes a cone portion, and 40 denotes a main cooling air pipe.

The air introduced into the cooling device 16 is blown into the bed from the cooling air conduit 36 and the lower part of the cone portion 38, and forms a moving bed in the cooling device 16. The air heated by clinkers is expanded and increases the flow velocity, thereby forming a partial fluidized bed in the upper part of the cooling device 16. This will be described in detail later with reference to FIG. 5.

Embodiment 2

Figure 5:
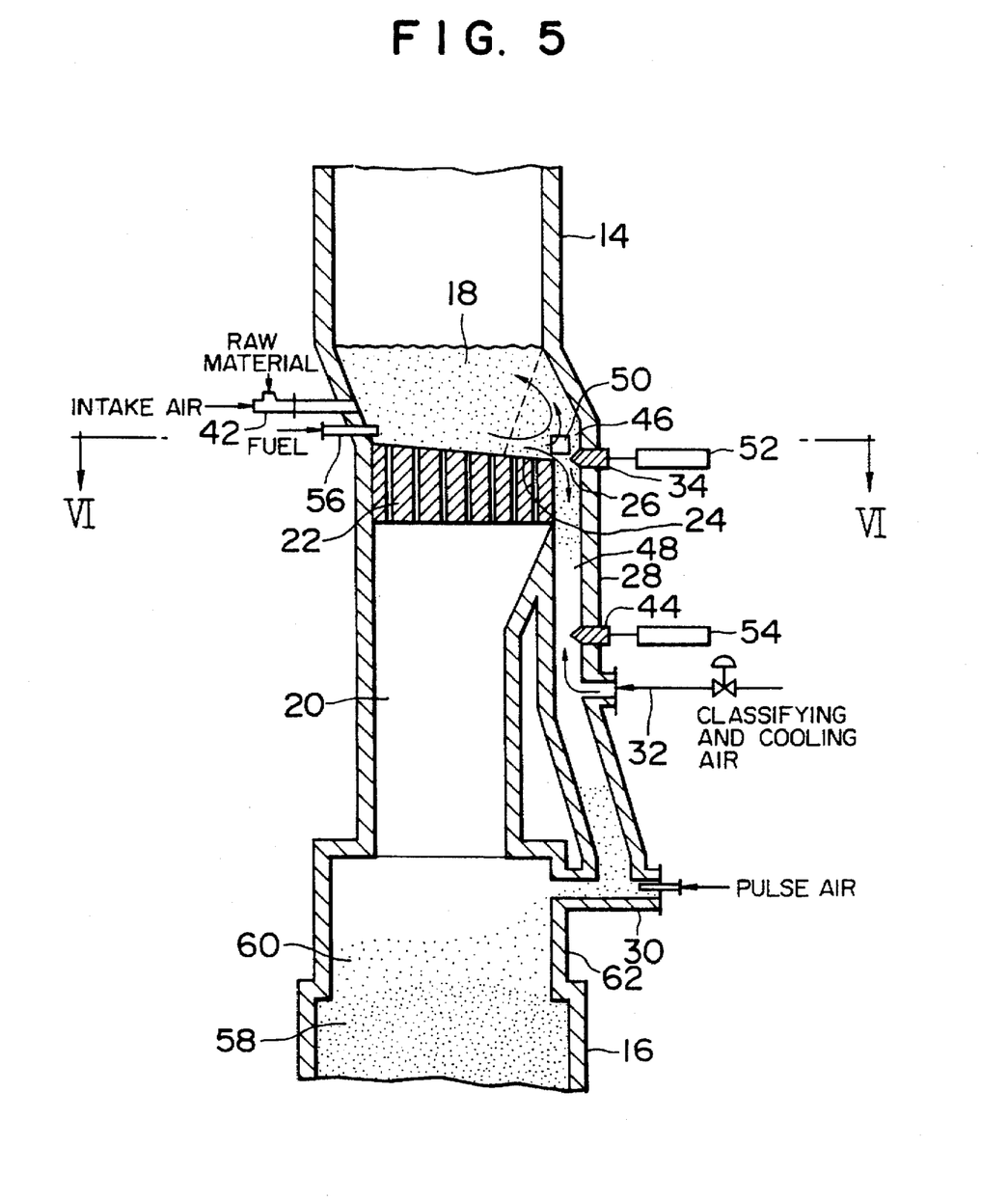
FIG. 5 is a cross-sectional view showing another embodiment of a sintering apparatus of cement clinkers according to the invention.
Figure 6:
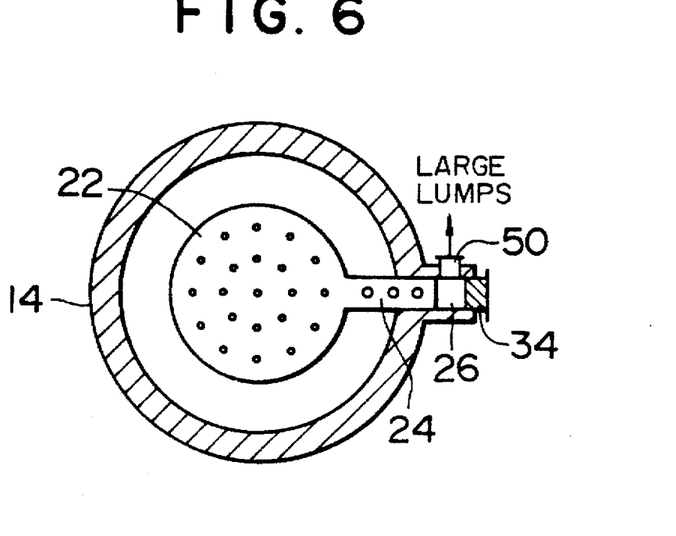
FIG. 6 is a cross-sectional view taken along the line VI—VI of FIG. 5, from which a fluidized bed is omitted.

FIG. 5 shows a sintering apparatus of cement clinkers according to the second embodiment of the invention; and FIG. 6 is a cross-sectional view taken along the line VI—VI in FIG. 5.

In this embodiment, the upper surface of a fluidizing gas distributor 22 is inclined, and a clinker dropping hole 26 is formed along the direction extending from the lower end of the inclined surface of the gas distributor 22, through a discharging grooved portion 24 with a plurality of openings and formed between the gas distributor 22 and the clinker dropping hole 26, while clinkers are classified right above the clinker dropping hole 26 and on the discharging grooved portion 24. In this case, the upper surface of the gas distributor 22 is inclined at an angle of 5 to 30 degrees, preferably 5 to 15 degrees, from the horizontal plane.

A throttle portion 44 for secondary classification of clinkers is provided in a discharge chute 28 between the clinker dropping hole 26 and an air intake pipe 32. While a primary classification zone 46 is defined right above the clinker dropping hole 26, a secondary classification zone 48 is defined in the upper side adjacent to the throttle portion 44.

A discharge port 50 for large lumps of coating peeling and the like is provided in the vicinity of the clinker dropping hole 26. Reference numeral 52 denotes drive means of the gate portion 34, 54 denotes drive means of the throttle portion 44, and 56 denotes a burner.

Hermetic discharge means 30 are designed to cause granulated material to accumulate temporarily therein, thereby intercepting ventilation by the material seal function effected by the granulated material itself, and also designed to discharge the granulated material into a cooling device 16 by ejecting the granulated material by compressed air or mechanical means.

As one embodiment, the cooling device 16 has a structure that, in the main body of the cooling device, a moving bed 58 is formed by the cooling air blown thereinto, and the cross-sectional area of the upper portion of the main body of the cooling device is determined so that a partial fluidized bed 60 is formed on the moving bed 58. FIG. 5 shows a structure in which a smaller-diameter portion 62 is provided in the upper portion of the main body of the cooling device while the air being heated and expanded by clinkers forming the moving bed 58 further increases the flow velocity at the smaller-diameter portion 62, thus forming a partial fluidized bed 60.

With such a structure, the partial fluidized bed 60 is formed on the moving bed 58, causing the clinkers to be fluidized to decrease segregation, thereby advantageously reducing the eccentric air flow. Other components have substantially the same structures and functions as those of the first embodiment.

Figure 7:
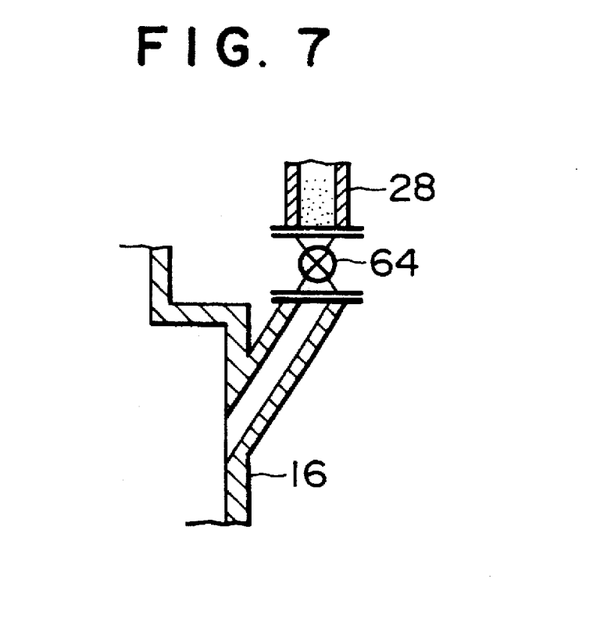
FIG. 7 is a cross-sectional view schematically showing another embodiment of hermetic discharge means of FIG. 5.

In FIG. 5, an L-shaped valve is employed as the hermetic discharge means 30. However, as shown in FIG. 7, a valve such as a rotary valve 64 may be provided at the lower end of the discharge chute 28. In this case, a discharge amount from the rotary valve 64 may be regulated to cause the granulated material to accumulate to a predetermined amount in the discharge chute 28, thereby introducing the granulated material into the cooling device 16.

Embodiment 3

Figure 8:
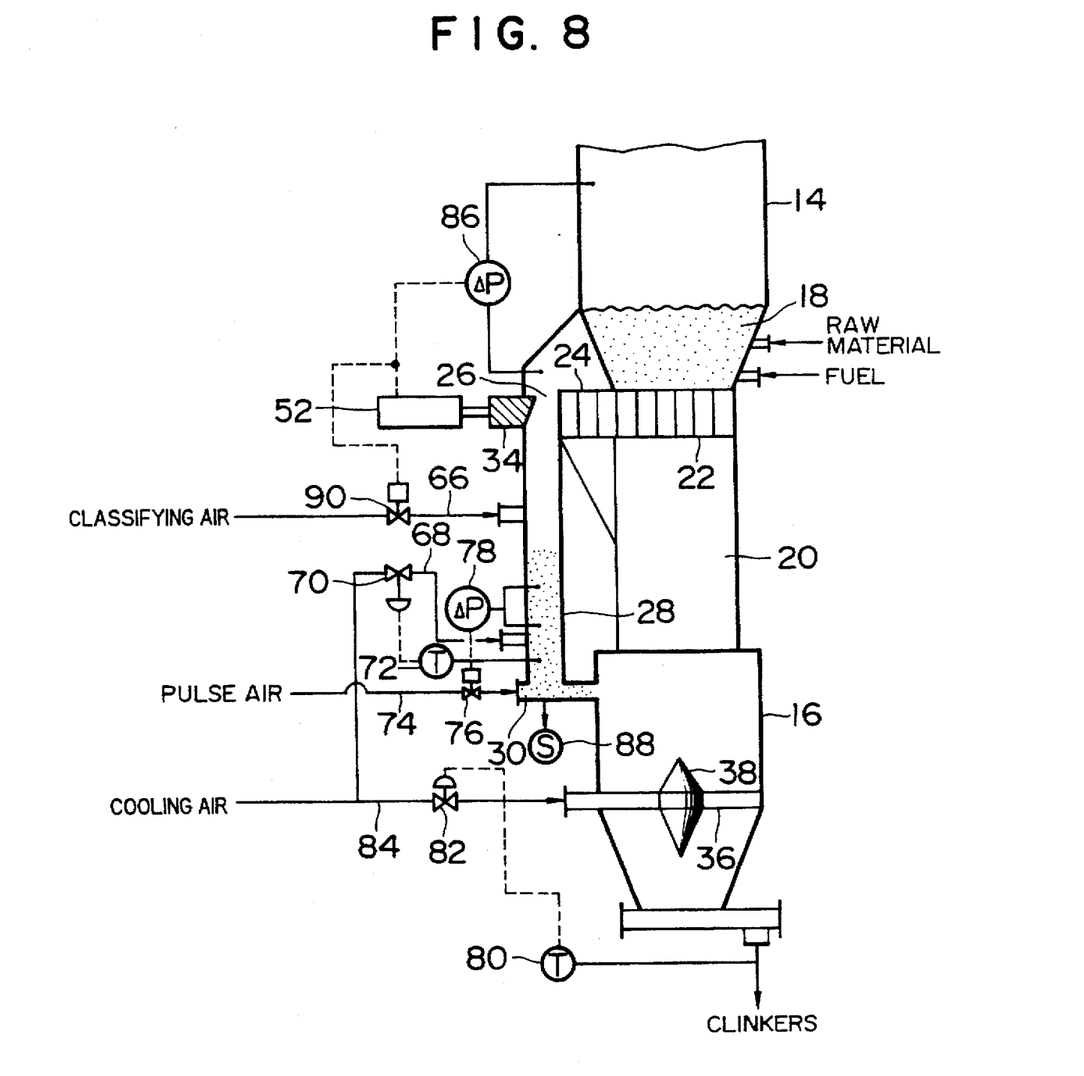
FIG. 8 is a cross-sectional view schematically showing still another embodiment of a sintering apparatus of cement clinkers according to the invention.

FIG. 8 shows a sintering apparatus of cement clinkers according to the third embodiment of the invention.

In this embodiment, a classifying air intake pipe 66 and a cooling air intake pipe 68 are provided separately. A control valve 76 mounted in a pulse air pipe 74 is connected with a bed differential pressure detector 78 installed in the fluidized bed in the discharge chute 28, and the bed differential pressure detector 86 for detecting a differential pressure in a fluidized bed 18 is connected with a control valve 90 mounted in the classifying air intake pipe 66 and the drive means 52 of the gate portion 34 through a bed differential pressure controller (not shown). Reference numeral 80 denotes a temperature detector for clinker products, and the reference numeral 82 denotes a control valve mounted in a cooling air supply pipe 84. Other components have substantially the same structures as those of the first embodiment.

Next, the operation of the sintering apparatus of cement clinkers according to the invention will be described with reference to FIG. 8.

(1) A bed differential pressure of the fluidized bed 18 is detected by the bed differential pressure detector 86. Drive means 52 of a gate portion 34 is controlled to maintain the bed differential pressure within a predetermined range and to adjust the opening degree of the gate portion 34 so that granules remain in the bed for a predetermined period of time. Further, the bed differential pressure is finely regulated by the control valve 90. In some cases, the discharge amount is controlled by the temperature in the bed without changing the opening degree of the gate portion. (The discharge amount varies in accordance with the particle size.)

(2) The clinker temperature in the discharge chute 28 is detected by the temperature detector 72. In order to maintain said temperature (the primary cooling temperature) not higher than 1100° C., a control valve 70 mounted in the cooling air intake pipe 68 is controlled.

(3) A bed differential pressure between two points in the discharge chute 28 is detected by a bed differential pressure detector 78. When clinkers exist at the detected position (when the differential pressure is large), the control valve 76 mounted in the pulse air pipe 74 is opened to discharge clinkers from the hermetic discharge means 30. When clinkers do not exist at the detected position (when the differential pressure is small), the control valve 76 is closed to stop the clinker discharge. This operation is performed to maintain the height of material seal in the discharge chute 28 substantially at a constant level.

(4) Since the control valve 90 is for classifying control, when sampling is effected by sampling means 88 of the hermetic discharge means 30 and the particle size of sampled clinkers is large, the control valve 90 is set free from the control of the bed differential pressure detector 86 and the opening of the control valve 90 of the classifying air intake pipe 66 is narrowed to decrease the amount of classifying air. When the particle size of sampled clinkers is small, the opening degree of the control valve 90 is widened to increase the amount of classifying air.

(5) The temperature of clinker products at the outlet of a cooling device 16 is detected by the temperature detector 80. The valve 82 in the cooling air supply pipe 84 is regulated to control the secondary cooling temperature in the cooling device 16.

Figure 9:
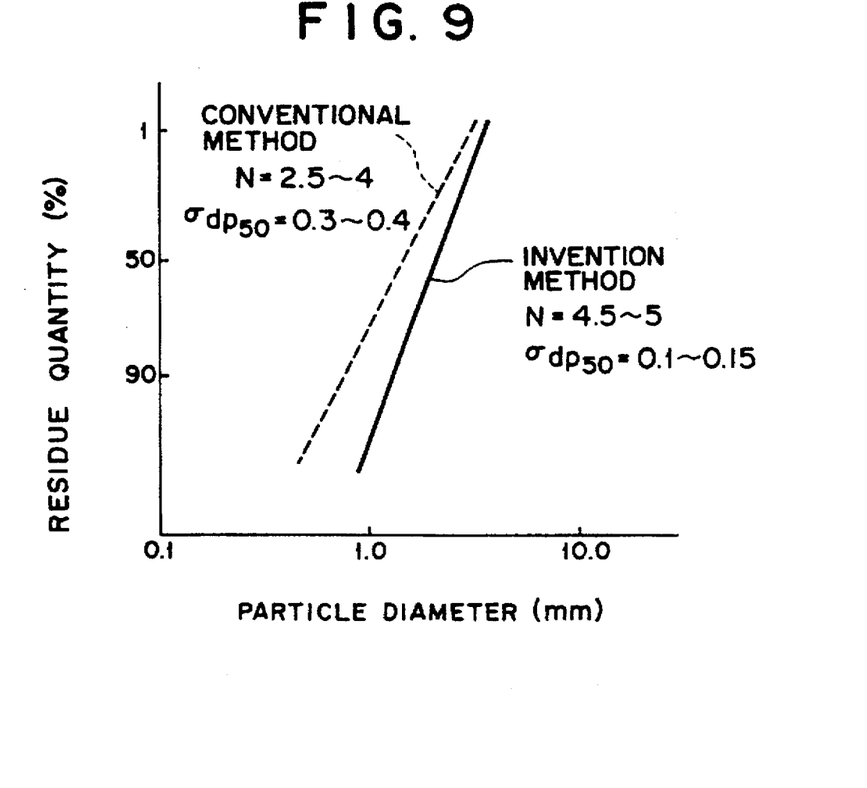
FIG. 9 is a graph of particle size distribution curves (Rosin-Rammler curves) obtained by the invention and a conventional method.

Experiments were performed using the apparatus of the invention shown in FIG. 8 and a conventional apparatus (which is constructed by eliminating the classifying and discharging mechanism from the apparatus shown in FIG. 8). FIG. 9 shows particle size distribution curves (Rosin-Rammler curves) illustrative of the results of the experiments. The abscissa represents the particle size, and the ordinate represents the residue quantity.

As shown in FIG. 9, in the conventional method, the inclination N of the particle size distribution curve is as small as 2.5 to 4, and it can be seen that particle sizes are not uniform. Also, from many other test results, it was found that a standard deviation of average particle sizes $\sigma dp_{50}$ (a standard deviation of particle sizes at 50 wt. % passing ($dp_{50}$)) is as large as 0.3 to 0.4. On the other hand, in the method of the invention, it can be seen from FIG. 9 where an inclination N is as large as 4.5 to 5 that particle sizes are uniform. Also, from many other test results, it was found that a standard deviation of average particle sizes $\sigma dp_{50}$ is as small as 0.1 to 0.15.

Table 1 below shows performance comparisons when cement clinkers are manufactured by the apparatus according to the invention shown in FIG. 8 and the conventional apparatus of a dual-furnace type disclosed in FIG. 1 of JP-A-2-229745. It can be seen from Table 1 that the number of components (the number of fluidized beds) is smaller in the method of the invention causing the reduction in both the heat consumption and power consumption.

TABLE 1

|  | Conventional Method | Invention Method |
| --- | --- | --- |
| Production (t/d) | 200 | 200 |
| Heat Consumption (kcal/kgcl) | 800 | 700 |
| Power Consumption (KWH/tcl) | 30 | 20 |
| Equipment Cost (%) | 100 | 80 |

Figure 10:
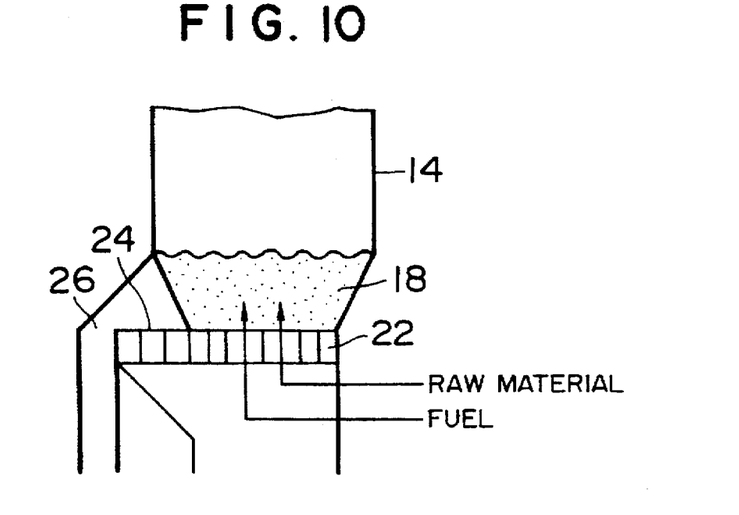
FIG. 10 is a diagram schematically showing another embodiment of a fluidized bed and components neighboring a fluidizing gas distributor, a fluidizing gas distributor (perforated plate) in an apparatus according to the invention.
Figure 11:
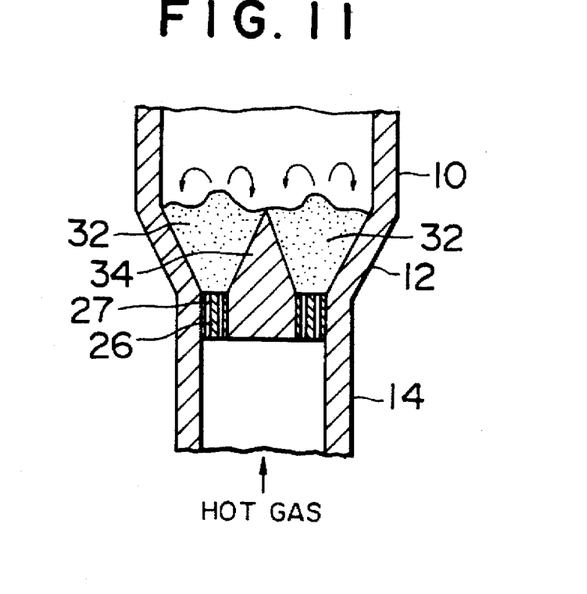
FIGS. 11 and 12 are diagrams schematically showing modified embodiments of fluidized bed granulating and sintering furnaces in an apparatus according to the invention.
Figure 12:
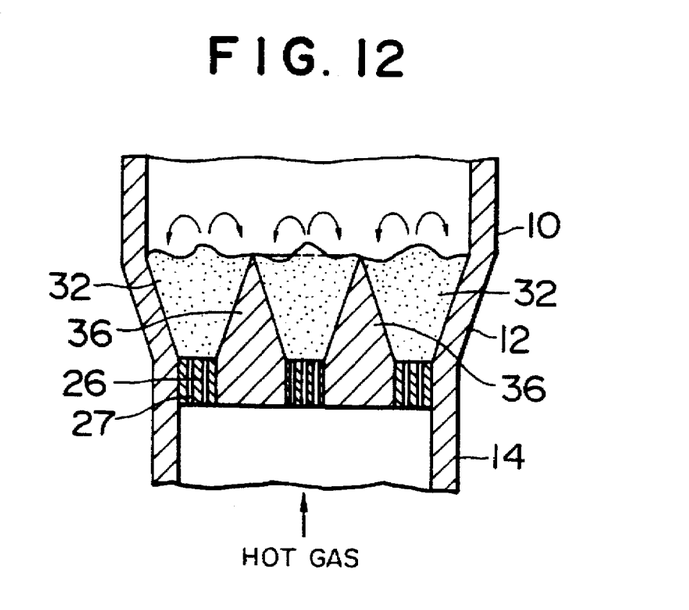

In any of the foregoing embodiments, raw material powder and fuel are supplied from the side of the fluidized bed. However, as shown in FIG. 10, raw material powder and fuel may be supplied from the bottom of the fluidized bed 18. Further, as shown in FIGS. 11 and 12, a fluidized bed granulating and sintering furnace may comprise a conical member whose upper portion is angularly projected above a fluidizing gas distributor, which conical member is coaxially provided on the gas distributor, so as to form an annular fluidized bed. As indicated in FIG. 12, the conical member may have in the center a coaxial recess extending to the gas distributor.

The embodiments using a single line of the classifying and discharging mechanism have been described above. However, when the furnace is increased in size, a plurality of lines of classifying and discharging mechanisms may be provided.

USABILITY ON INDUSTRY

The present invention which comprises the above-described structure produces the following effects:

(1) Since the particle sizes can be controlled precisely, the particle size distribution in the fluidized bed granulating and sintering furnace becomes sharp causing that sintering at the temperature of 1450° C. or higher can be effected even in the apparatus of a single-furnace structure, thereby obtaining high-quality products. Consequently, a fluidized bed sintering furnace, as disclosed in JP-A-2-229745, is not required. Moreover, segregation in the cooling device is not caused, thus the heat recovery efficiency is improved.

(2) Because the granulated material is classified on the discharging grooved portion and right above the clinker dropping hole, fine granules rarely drop into the discharge chute (mixing of granules in the chute with granules in the fluidized bed does not occur). Therefore, the amount of fuel consumed in the fluidized bed granulating and sintering furnace can be reduced and, the cooling efficiency in the discharge chute can be improved.

(3) Granules are quenched in the discharge chute (for example, they are quenched down to 1100° C. or lower). Consequently, clogging of the discharge chute is seldom caused, and the heat loss is decreased, so that a primary cooling device as disclosed in JP-A-2-229745 becomes unnecessary. In the apparatus disclosed in JP-A-2-229745, the discharge chute of the granulating furnace and the discharge chute of the sintering furnace must be water-cooled and air-cooled for the prevention of their clogging, and therefore, the heat loss is large, and the quality of products is unfavorably affected.

(4) Since the apparatus of the invention does not require a fluidized bed sintering furnace and a primary cooling device, construction costs, heat consumption and power consumption can be reduced by a large degree, and also, the operation of the apparatus can be simplified.

(5) The temperature of the throat portion is lowered, and Consequently, coating on the lower surface of the gas distributor of the fluidized bed granulating and sintering furnace can be eliminated.

(6) The classifying efficiency is further improved when the gas distributor is inclined downwardly, when the diameter of nozzles of the discharging grooved portion is different from that of nozzles of the gas distributor, and when a throttle portion for secondary classification of the clinkers is provided in the discharge chute.

(7) The classified particle size and the cooling temperature can be maintained at predetermined values, thereby a steady manufacturing operation can be obtained, when the cooling temperature in the discharge chute is controlled, when the flow rate of cooling air and the opening area of the clinker dropping hole are regulated, and when the discharge port for large lumps is provided in the vicinity of the clinker dropping hole.

(8) When the cross-sectional area of the upper portion of the cooling device is determined so as to fluidize the upper portion of the bed in the moving bed cooling device, heat consumption can be further reduced, thus the size of the cooling device can be reduced.

(9) Even when the apparatus is increased in size, the classifying performance is maintained, and consequently, the size of the apparatus can be easily increased.

We claim:

1. A method of sintering cement clinkers comprising the steps of:

a) preheating raw cement powder material;

b) granulating and sintering said preheated raw cement powder material in a combined fluidized bed granulating and sintering furnace to form granulated and sintered clinkers;

c) classifying said clinkers above a clinker dropping hole and on a discharging grooved portion, said clinker dropping hole being provided in a radial direction extending from an upper surface of a fluidizing gas distributor of the granulating and sintering furnace through the discharging grooved portion, said grooved portion having a plurality of nozzles and being formed between the gas distributor and the clinker dropping hole;

d) discharging classified clinkers from the fluidized bed granulating and sintering furnace through said clinker dropping hole;

e) further classifying and cooling the clinkers by blowing air into a discharge chute connected to the clinker dropping hole while regulating the amount of the blown air in such a manner that granulated and sintered clinkers are quenched down to 1100° C. or lower, and wherein a flow velocity of the air blowing from the clinker dropping hole is different from a flow velocity of air flowing through the nozzles of the gas distributor; and f) introducing the clinkers into a cooling device via hermetic discharge means provided below a classifying and cooling air intake position.

2. A method of sintering cement clinkers according to claim 1 wherein said gas distributor includes a conical member whose upper portion is angularly projected above the gas distributor of the fluidized bed granulating and sintering furnace, said conical member being coaxially provided on a gas distribution plate, so as to form an annular fluidized bed.

3. A method of sintering cement clinkers according to claim 1, further comprising the step of regulating an open area of the clinker dropping hole to maintain a differential pressure of the fluidized bed within a range.

4. A method of sintering cement clinkers according to claim 1 wherein classifying air and cooling air are separately blown into the discharge chute.

5. A method of sintering cement clinkers according to claim 1, further comprising the steps of detecting a temperature of the clinkers in the discharge chute, and regulating the amount of cooling air in accordance with the detected temperature to cool the clinkers, thereby controlling the cooling of the clinkers.

6. An apparatus for sintering cement clinkers comprising a fluidized bed granulating and sintering furnace in which preheated cement raw material powder is granulated and sintered, and a cooling device in which granulated and sintered clinkers are cooled, wherein a clinker dropping hole is formed in a radial direction extending from an upper surface of a fluidizing gas distributor of the fluidized bed granulating and sintering furnace through a discharging grooved portion which has a plurality of nozzles and is formed between the gas distributor and the clinker dropping hole, while the clinkers are classified right above the clinker dropping hole and on the discharging grooved portion, the clinker dropping hole being connected to the cooling device via a discharge chute and hermetic discharge means, and a classifying and cooling air intake pipe for classifying and cooling the clinkers being connected to the discharge chute.

7. An apparatus for sintering cement clinkers according to claim 6, further comprising a conical member whose upper portion is angularly projected above the gas distributor of the fluidized bed granulating and sintering furnace, said conical member being coaxially provided on the gas distributor, so as to form an annular fluidized bed.

8. An apparatus for sintering cement clinkers according to claim 6 wherein a controllable gate is provided in the vicinity of the clinker dropping hole to control an open area of the clinker dropping hole.

9. An apparatus for sintering cement clinkers according to claim 6 wherein a classifying air intake pipe and a cooling air intake pipe are separately provided in place of the classifying and cooling air intake pipe.

10. An apparatus for sintering cement clinkers according to claim 6, wherein the upper surface of said gas distributor is inclined, and the clinker dropping hole is formed in a radial direction extending from a lower end of the inclined surface of the gas distributor through the discharging grooved portion.

11. An apparatus for sintering cement clinkers according to claim 10, wherein the gas distributor has a plurality of nozzles, and wherein the nozzles of said discharging grooved portion have a different diameter than the nozzles of said gas distributor.

12. An apparatus for sintering cement clinkers according to claim 6 wherein a throttle portion for secondary classification is provided in the discharge chute between the clinker dropping hole and the air intake pipe.

13. An apparatus for sintering cement clinkers according to claim 6 wherein a discharge port for lumps is provided in the vicinity of the clinker dropping hole.

14. An apparatus for sintering cement clinkers according to claim 6 wherein a moving bed formed in a main body of the cooling device is moved by cooling air blown into the main body of the cooling device, and an upper portion of the main body of the cooling device has a cross-sectional area selected to form a partial fluidized bed on the moving bed.

15. An apparatus for sintering cement clinkers according to claim 14, wherein the cooling device includes a smaller-diameter portion and a larger-diameter portion, and wherein the smaller-diameter portion is provided in the upper portion of the main body of the cooling device.

16. A method of sintering cement clinkers comprising the steps of:

a) preheating raw cement powder material;

b) granulating and sintering said preheated raw cement powder material in a combined fluidized bed granulating and sintering furnace to form granulated and sintered clinkers;

c) classifying said clinkers to provide a standard deviation of particle size at 50 wt. % passing of 0.15 or less; and d) discharging said classified clinkers from the fluidized bed granulating and sintering furnace.

* * * * *